United States Patent [19]
Patel

[11] Patent Number: 6,067,791
[45] Date of Patent: May 30, 2000

[54] TURBINE ENGINE WITH A THERMAL VALVE

[75] Inventor: Kiritkumar Patel, Oakville, Canada

[73] Assignee: Pratt & Whitney Canada Inc., Longueuil, Canada

[21] Appl. No.: 08/988,559

[22] Filed: Dec. 11, 1997

[51] Int. Cl.[7] .................................................. F02C 7/00
[52] U.S. Cl. ........................................ 60/39.07; 415/104
[58] Field of Search .............................. 60/39.07, 39.24, 60/39.75; 415/104, 106, 107

[56] References Cited

U.S. PATENT DOCUMENTS

| | | | |
|---|---|---|---|
| 2,530,477 | 11/1950 | Ostmar | 415/104 |
| 2,647,684 | 8/1953 | Lombard | 415/104 |
| 3,688,982 | 9/1972 | McAninch et al. . | |
| 3,736,069 | 5/1973 | Beam, Jr. et al. . | |
| 3,966,354 | 6/1976 | Patterson . | |
| 4,023,919 | 5/1977 | Patterson . | |
| 4,217,755 | 8/1980 | Williams . | |
| 4,251,185 | 2/1981 | Karstensen . | |
| 4,311,432 | 1/1982 | Kildea . | |
| 4,565,492 | 1/1986 | Bart et al. . | |
| 4,613,280 | 9/1986 | Tate . | |
| 4,615,657 | 10/1986 | Kreitmeier . | |
| 4,730,977 | 3/1988 | Haaser | 415/104 |
| 4,759,883 | 7/1988 | Woody et al. . | |
| 4,852,601 | 8/1989 | Chamberlin . | |
| 4,907,943 | 3/1990 | Kelch | 415/104 |
| 5,001,896 | 3/1991 | Hilt et al. . | |
| 5,154,048 | 10/1992 | Ponziani et al. . | |
| 5,316,437 | 5/1994 | Czachor . | |
| 5,423,659 | 6/1995 | Thompson . | |
| 5,540,546 | 7/1996 | Bouricet . | |

FOREIGN PATENT DOCUMENTS 3213999 10/1983 Germany .

Primary Examiner—Louis J. Casaregola
Attorney, Agent, or Firm—Jeffrey W. Astle

[57] ABSTRACT

A turbine engine having interior cavity sealed by a thermally controlled valve is disclosed. The cavity is defined by at least one cylindrical wall portion. The valve comprises an opening in the cylindrical wall portion and a cylindrical band, coaxial and interior to the wall portion. The cylindrical band is made of material having a higher thermal coefficient of expansion than the wall portion. As the temperature of the engine increases, the band expands at a higher rate than the wall, thereby sealing the valve. As the temperature decreases, the band contracts thereby opening the valve. The valve may be used to permit a cavity to be pressurized at low temperatures. The pressure in the cavity may exert a forward load on a thrust bearing, suspending the engine shaft.

10 Claims, 3 Drawing Sheets

6,067,791

TURBINE ENGINE WITH A THERMAL VALVE

FIELD OF THE INVENTION

The present invention relates to turbine engines, and more specifically to turbine engines having an interior cavity sealed, at least partially, by a temperature responsive thermal valve.

BACKGROUND OF THE INVENTION

Turbine engines, such as those used as aircraft turbojets or turbofans typically comprise from front to rear, in the direction of fluid flow in the engine, fan, compressor and turbine sections within an engine casing. These engine sections comprise a rotating fan, compressor, and turbine that are axially mounted on one or more coaxial shafts for rotation about a central axis of the engine. The shafts are supported by at least two bearing assemblies. These bearing assemblies permit rotation of the shafts, and in turn the fan, compressor and turbine. Typically, the front-most bearing assembly in the direction of fluid flow in the engine also prevents axial movement of the shaft within the case and is referred to as a "thrust bearing assembly".

While thrust bearing assemblies are typically machined to tight tolerances, small amounts of play between the ball bearings and the bearing races within the housings exist. This play is undesirable as it causes unnecessary noise and vibration of the engine, when the engine is in operation. It is particularly noticeable at low engine speeds.

Much of this play can be eliminated by exerting a load in an axial direction either forward or rearward on the bearing. Such a load say, for example in the forward direction, may be transferred to the bearing through the shafts. The forward load may, for example be exerted by pressurized gases from the compressor exerting a forward force on the rear portion of the compressor section, which in turn exerts a forward force on the shafts. However, due to size constraints on the engine and performance requirements of the compressor section, the amount of pressure exerted in conventional engine designs may not be enough to place sufficient forward load on the thrust bearing in order to sufficiently reduce the play in the bearing assembly and accompanying noise and vibration. Moreover, the force exerted by such pressurized gases will vary depending on the rotational speed, pressure and temperature within the engine.

One solution to address this problem has been to include a rotating balance piston mounted on the shaft, aft the compressor section of the engine, as will be described in greater detail below. This balance piston is located between a high and low pressure region within the engine. The pressure differential on the piston exerts a forward force on the shaft, and in turn on the thrust bearing. The pressure differential across the piston, however, also varies with the rotational speed and temperature of the engine. The higher the speed and temperature of the engine the greater the pressure differential across the piston.

SUMMARY OF THE INVENTION

The present invention presents a modified turbine engine design in which forward load on a thrust bearing at low rotational speeds is improved, while having minimal effects on engine performance at higher speeds.

In accordance with an aspect of the present invention, there is provided a turbine engine within an engine casing, the turbine engine having a longitudinal axis, the turbine engine comprising a shaft mounted to a thrust bearing for rotation about the axis; first and second wall portions at least partially defining a cavity within the engine casing; the first wall portion extending in a direction generally away from the shaft and fixed for rotation therewith; the second wall portion fixed to the casing; a temperature controlled valve having an outlet in communication with the cavity and an inlet in communication with pressurized gases within the engine, the temperature controlled valve in temperature sensing relation with the ambient temperature of the engine whereby the cavity may be pressurized by the gases to load the first wall portion and thereby the thrust bearing through the shaft, when the valve is open.

In accordance with another aspect of the present invention, there is provided a thermal valve for a gas turbine engine, said engine within an engine casing, the engine having a longitudinal axis, the valve comprising: a first axially extending wall portion partially defining a cavity within the casing, the first wall portion having an opening extending into the cavity in flow communication with a source of pressurized gases from said engine; a second axially extending wall portion coaxial with the first wall portion, the second wall portion fixed in overlapping relationship with the opening; the first and second wall portions having differing coefficients of thermal expansion, so that at least one of the first and second wall portions expands and contracts radially in response to changes in temperature of the engine, and seals the opening once the temperature exceeds a threshold.

In accordance with a further aspect of the present invention, there is provided a method of applying a load to a thrust bearing in a turbine engine within an engine casing, the turbine engine having a longitudinal axis, the turbine engine comprising a shaft mounted to the thrust bearing for rotation about the axis; a wall portion extending in a direction generally away from the shaft and fixed for rotation therewith, partially defining a cavity; the method comprising the steps of a) sensing ambient temperature within the engine b) bleeding an amount of pressurized gas into the cavity, the amount of gas proportional to the sensed temperature hereby exerting a forward load proportionate to the temperature on the wall portion, the shaft, and the thrust bearing.

BRIEF DESCRIPTION OF THE DRAWINGS

In the figures which will illustrate embodiments of the invention.

DETAILED DESCRIPTION OF THE PREFERRED EMBODIMENTS

Figure 1:
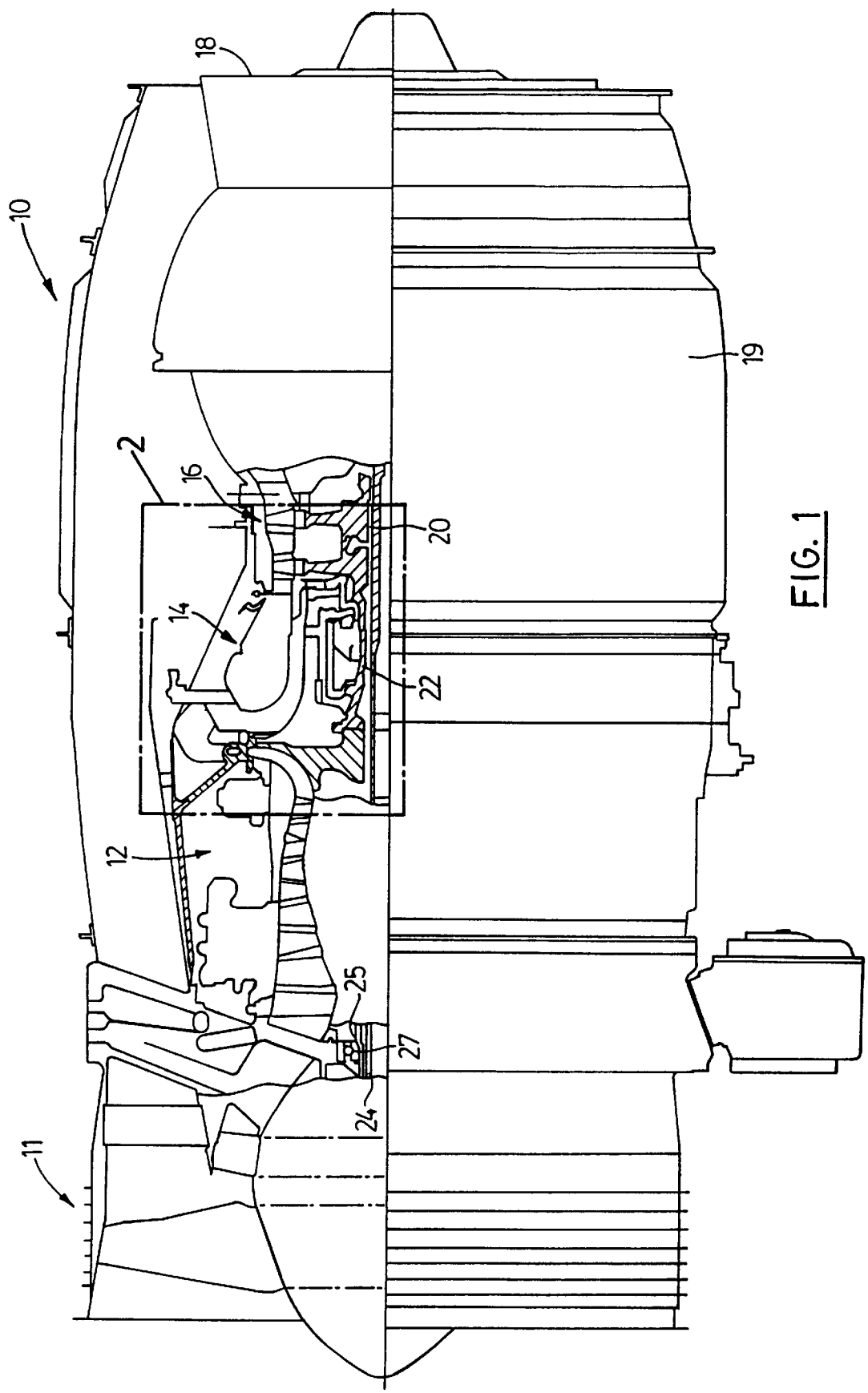
FIG. 1 is a side plan view, party in cross-section, of a representative turbine engine in accordance with an aspect of the present invention.

FIG. 1, illustrates a representative gas turbine engine 10. Engine 10 comprises a fan section 11, and a core engine which comprises in flow series: a compressor section 12; a combustion section 14; a turbine section 16; and an exhaust 18 all mounted within engine casing 19.

The turbine section 16 and compressor section 12 comprise multiple stages. At least one turbine within turbine section 16 is rotationally connected to the final stage of compressor section 12 by shaft 20. Shaft 20 is supported near its rear by roller bearing assembly 22 and near its front by thrust bearing assembly 24. Thrust bearing assembly 24 comprises a thrust bearing 27 within a housing 25.

Figure 2:
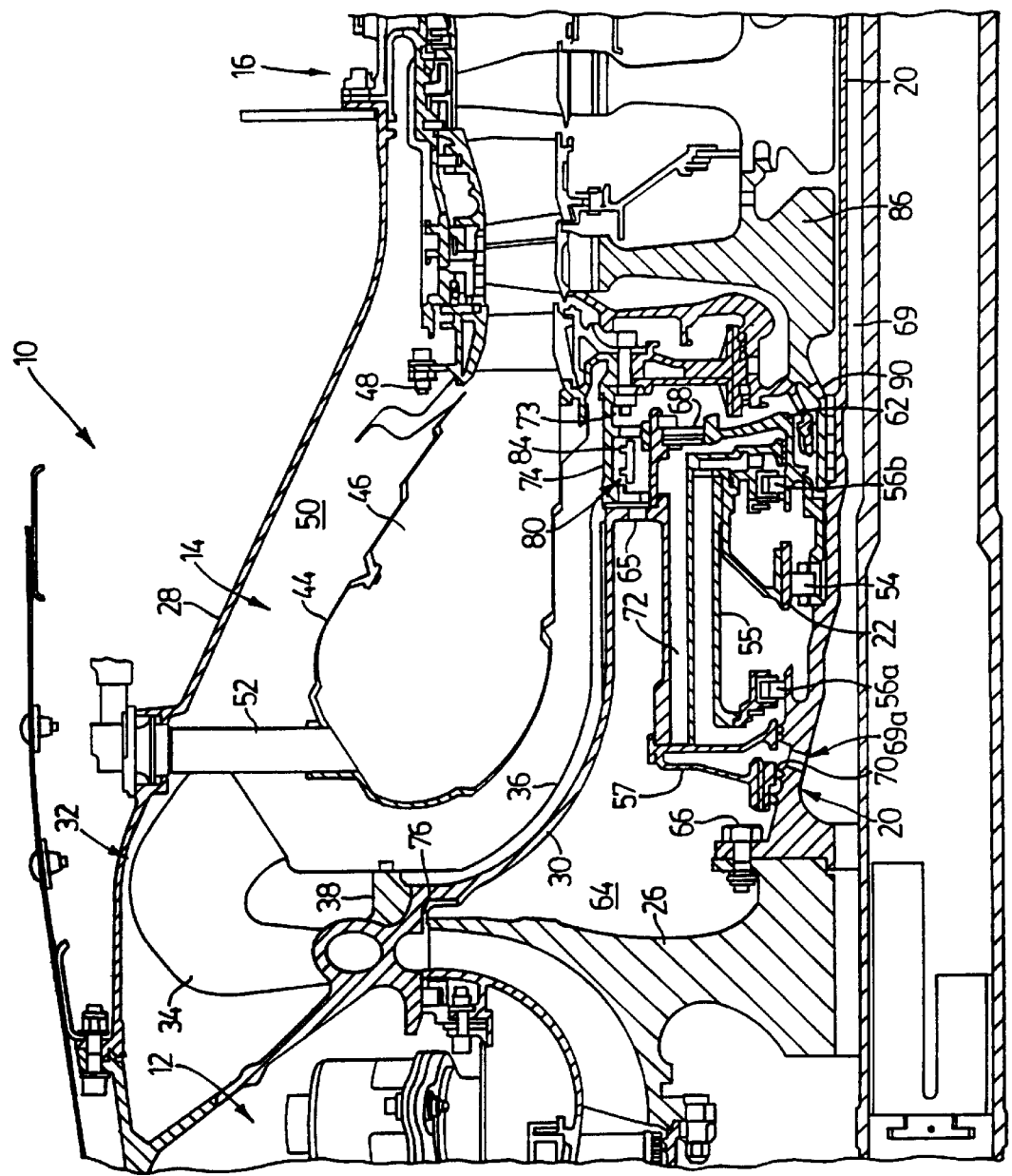
FIG. 2 is an enlarged cross-sectional view of a portion of FIG. 1.

FIG. 2 illustrates, in cross section, a portion of a turbine engine encompassing the rear of compressor section 12 and the front of combustion section 14. The final stage of the compressor section 12 is a rotating impeller 26 in flow communication with combustion section 14. Impeller 26 is mounted to outermost shaft 20 for rotation about a central axis of the engine. A stub shaft 66 rotates with impeller 26.

Combustion section 14 comprises the annular cavity confined radially by combustor case 28 and diffuser case 30 which forms part of diffuser assembly 32. Diffuser assembly 32 further comprises diffuser pipes 34, heat shield 36, and heat shield support 38. There is a gap 76 between diffuser case 30 and the tip of impeller 26.

Diffuser pipe 34 is located within combustion section 14, and provides fluid communication between the tip of impeller 26 and combustion section 14. Additionally, within combustion section 14 is a combustor liner 44 defining combustion chamber 46. The liner is mounted to the engine housing 19 (FIG. 1) by case support 48. Combustion chamber 46 is in fluid communication with high pressure ("P3") region 50 of combustion section 14. Also in fluid communication with combustion chamber 46 is fuel nozzle 52.

Roller bearing assembly 22, comprising housing 55 and bearing 54 support the rear of shaft 20. Carbon seals 56*a* and 56*b* seal assembly 22. Also mounted to shaft 20 for rotation therewith is balance piston 62.

The bottom portion of diffuser case 30 and rear outer surface of impeller 26 and the front cover 57 of roller bearing housing 55 define an impeller rear cavity 64 ("IRC"). IRC 64 is partially sealed by labyrinth seals 70 and brush seal 68. Brush seal 68 extends from the rear portion of bearing housing 55 and seals a cavity 72 forward of balance piston 62. Cavity 72 is in flow communication with a low pressure region 69, adjacent to shaft 20, through holes, 69*a* in the stub shaft 66.

A cavity 73 is aft IRC 64 and is in flow communication with IRC 64 through end 65. Cavity 73 is partially defined by cylindrical wall portion 74 fixed to casing 19, brush seal 68 and balance piston 62, extending generally radially from shaft 20. High pressure turbine disc front extension bores 90 extend through rear turbine disc 86 and form flow connections between cavity 73 and turbine portion 16 of engine 10. Thus, a complete flow path extends from tip of impeller 26 through IRC 64, cavity 73 and bore 90 to turbine section 16.

Figure 3:
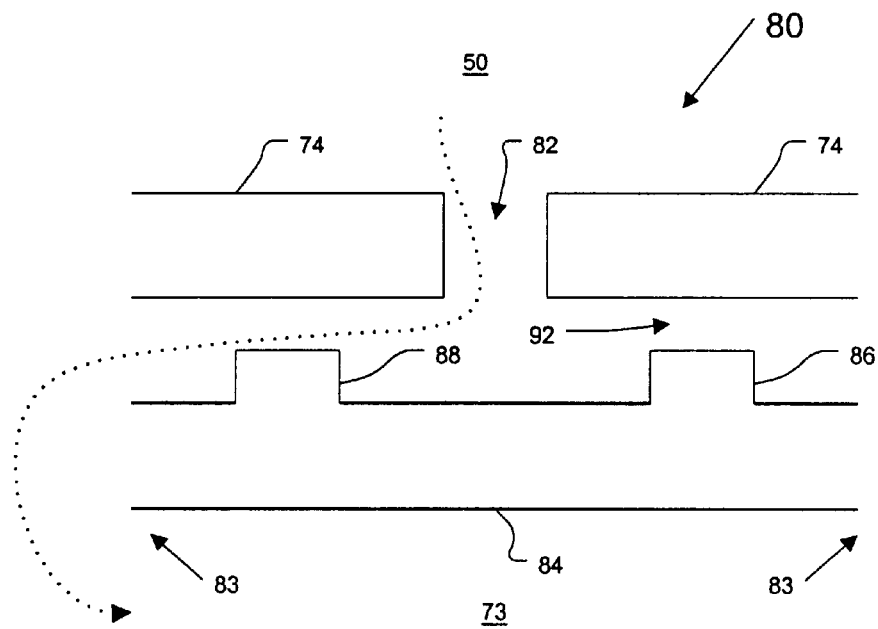
FIG. 3 is an enlarged view of a portion of FIG. 2.
Figure 4:
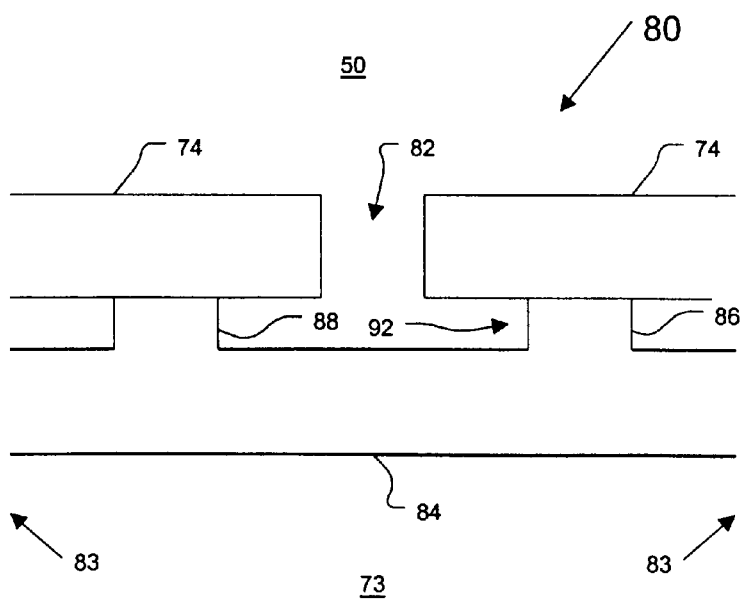
FIG. 4 is a further enlarged view of a portion of FIG. 2.

As illustrated in FIGS. 3 and 4, a valve arrangement 80 forms part of cavity 73. Valve arrangement 80 comprises a plurality of slots or openings 82 in wall 74, and a further cylindrical wall portion 84 coaxial with wall 74 and in overlapping arrangement with slots 82 forming radial gap 92. The cylindrical portion 84 is generally a "free floating ring" which changes its radius and length in response to its temperature. Extending from cylindrical portions 84 are annular bands 86 and 88. As explained in greater detail below, when engine 10 is inoperative or at low idle speeds, valve arrangement 80 is open as illustrated in FIG. 3. Gases from P3 region 50 pass through valve inlet openings 82, past annular bands 86 and 88 and through the valve outlets 83 into the region defined by cavity 73.

Cylindrical portion 74 and cylindrical wall portion 84 are both constructed of metal or alloy. However, the materials selected in constructing these cylindrical portions have differing coefficients of thermal expansion, with the interior cylinder 84 having a higher coefficient of thermal expansion than wall portion 74. Thus, as the temperatures of wall portions 74 and 84 increase, inner cylindrical portion 84 expands radially outward more than does cylindrical wall portion 74. For example, cylinder portion 84 may be AMS 5525 Steel, and wall portion 74, may be AMS 4975 titanium. The material chosen for cylinder portion 84 is such that at the temperature attained by the engine when operating at normal speeds, radial gap 92 closes, as illustrated in FIG. 4. It is known that the engine temperature of a turbine engine is directly proportional to its rate of rotation. Thus, valve arrangement 80 operates as a temperature controlled valve.

In operation, fan section 11 draws air into engine 10 and the air passes from fan section 11 to compressor section 12, where it is compressed by multiple compressor stages. The final stage of compression is impeller 26. High pressure air leaves the tip of impeller 26. The majority of this high pressure air is directed to P3 region 50 of combustion section 14 by diffuser pipe 34. There, much of the P3 air enters chamber 46 and is mixed with fuel from nozzle 52 and combusted. A small portion of the compressed P3 air, however, is bled into IRC 64 through unsealed gap 76 between the tip of impeller 26 and diffuser case 30. This bleed of impeller air pressurizes IRC 64 and cavity 73. Cavities so pressurized are typically referred to as "P2.9" regions of engine 10.

Pressurizing IRC 64 exerts a force on the rear of impeller 26 and diffuser case 30. The force on the rear of impeller 26 in turn exerts a forward force on shaft 20, and hence thrust bearing 27. In theory, engine 10 could be designed to provide sufficient surface area on the rear of impeller 26 so that the pressure in IRC 64 exerts sufficient forward pressure on the rear of impeller 26, and thus on thrust bearing 27, in order to reduce the play and the attendant noise and vibration in bearing assembly 24. However, in practice, size and weight of impeller 26 and engine 10, and the pressure of output air of compressor section 12, are of primary concern. Accordingly, the pressure within IRC 64 and rear surface area of impeller 26 are often insufficient to apply sufficient forward load on thrust bearing 27. Accordingly, additional forward load on shaft 20 and thrust bearing 27 are provided by balance piston 62, as follows.

High pressure air is allowed to exit IRC 64, at its rear 65. This pressurizes cavity 73 aft balance piston 62. Cavity 72, on the opposite side of balance piston 62, is in flow communication with a low pressure region 69 proximate shaft 20. As such, cavity 72 is at a lower pressure than cavity 73, thereby creating a pressure differential across balance piston 62. This pressure differential, will in turn, create a forward force on piston 62, shaft 20, and thrust bearing 27. The size of balance piston 62 and pressure differential across it may be chosen to compensate for inadequate forward force on the rear surface of impeller 26, thereby providing the requisite forward load on thrust bearing 27, at normal operating conditions.

However, absent valve arrangement 80, the pressure differential across piston 62 may not be sufficiently high in order to place a sufficient forward load on bearing 27 at take-off or low idle speeds. To compensate for this, valve assembly 80, in its open position, as illustrated in FIG. 3, allows P3 air to travel free from region 50 of combustion section 14, past annular bands 86 and 88 into cavity 73. This P3 air in cavity 73 provides additional pressure within cavity 73 and across piston 62. As the engine speed increases, less of the P3 air is required in cavity 73 in order to maintain the required pressure differential on piston 62. Further, disrupting the flow of P3 air in compartment 50, interferes with the efficiency of combustion section 14 and turbine section 16.

As cylindrical portion 84 has a higher thermal coefficient of expansion than cylindrical portion 74, the radial gap between the two cylinders narrows as the rotational speed and temperature of engine 10 increases. The materials of cylinders 74 and 84 are chosen so that at normal operating speed and temperatures for engine 10, annular rings 86 and 88 are urged into abutment with the interior portion of wall 74 thereby sealing valve arrangement 80 and cutting off the flow of P3 air into cavity 73 through openings 82. This closing of the valve therefore allows efficient operation of engine 10 at normal operating speed, with pressurizing of cavity 73 occurring because of the bleed from the tip of impeller 26.

Additionally, materials for cylindrical wall portions 74 and 84 may be chosen such that the radial gap between portions portion 84 and 74 decreases linearly with a corresponding increase in engine temperature and speed, from idle condition to normal operating conditions. This varies the effective size of the passageway from P3 region 50 to cavity 73 through openings 82. Thus at speeds and temperatures below normal operating conditions, the amount of P3 air bled through openings 82 into cavity 73 varies in direct relation to engine temperature/speed. This is preferred since pressure across piston 62, absent valve arrangement 80, also varies in direct relation to engine temperature/speed. The size of the opening in valve arrangement 80 is thus modulated with engine speed and temperature, compensating for any deficiency in pressure differential across piston 62 in order to provide the required forward load on thrust bearing 27.

It will, of course be understood, that the above embodiments may be modified in a number of ways. For, example, valve arrangement 80 could form part of the wall 30 of IRC 64, thereby allowing P3 air to pressurize IRC 64 directly and cavity 73 indirectly, through the opening in the rear 65 of IRC 64.

Valve arrangement 80 could be arranged with cylindrical wall portion 74 having annular bands 86, 88 instead of cylindrical wall portion 84. Further, wall portion 84 could be arranged exteriorly of wall portion 74, having a lesser coefficient of thermal expansion. Wall portion 74 would then expand to seal valve arrangement 80. While not preferred, valve arrangement 80 could be replaced with a temperature impervious valve which operated in response to an ambient temperature sensor.

Similarly, valve arrangement 80 can be used to partially seal any cavity at least partially defined by a cylindrical wall within a turbine engine, as may be required for any number of applications.

It will be further understood that the invention is not limited to the illustrations described herein which are merely illustrative of a preferred embodiment of carrying out the invention, and which are susceptible to modification of form, size, material choice, arrangement of parts and details of operation. The invention may be easily implemented to modify existing engine designs other than the representative engine, described above. The invention, rather, is intended to encompass all such modification within its spirit and scope, as defined by the claims.

I claim:

1. A turbine engine within an engine casing, said turbine engine having a longitudinal axis, said turbine engine comprising:

a shaft mounted to a thrust bearing for rotation about said axis;

first and second wall portions at least partially defining a cavity within said engine casing;

said first wall portion extending in a direction generally away from said shaft and fixed for rotation therewith;

said second wall portion fixed to said casing;

a temperature controlled valve having an outlet in communication with said cavity and an inlet in communication with pressurized gases within said engine, said temperature controlled valve in temperature sensing relation with the ambient temperature of said engine whereby said cavity may be pressurized by said gases to load said first wall portion and thereby said thrust bearing through said shaft, when said valve is open.

2. The turbine engine of claim 1 wherein said valve comprises a thermally sensitive element which expands when heated to modulate the opening of said valve.

3. The turbine engine of claim 2, wherein said first wall portion comprises a balance piston.

4. The turbine engine of claim 3, wherein said cavity has an opening in communication with gases from an impeller forming part of a combustion section for said engine, and a further opening permitting flow of gases from said impeller tip to a turbine section of said engine when said valve is open or closed.

5. The turbine engine of claim 1 wherein said valve is arranged to close as temperature of said engine increases, and to open as said temperature of said engine decreases.

6. The turbine engine of claim 5 wherein said valve is arranged to fully close when said temperature of said engine reaches a predetermined value of operating temperature for said engine.

7. The turbine engine of claim 1, wherein said second wall portion comprises a first generally cylindrical portion about said shaft, and wherein said temperature controlled valve comprises:

a valve inlet opening in said first generally cylindrical portion in communication with said high pressure gases; and a second generally cylindrical portion, coaxial with said first portion and spaced radially therefrom when said valve is open;

wherein said first cylindrical portion and said second cylindrical portions have different thermal coefficients of expansion, so that at least one of said first and second cylindrical portions expands radially to close said opening as said engine temperature increases.

8. The turbine engine of claim 7 wherein at least one of said first and second cylindrical portions contracts to open said valve as said engine temperature decreases.

9. The turbine engine of claim 8, wherein at least one of said first and second cylindrical portions expands linearly over a chosen temperature range to reduce flow of said high pressure gases into said cavity in direct relation to increases in said engine temperature.

10. The turbine engine of claim 9 wherein one of said first and second generally cylindrical portions comprises two annular bands extending therefrom toward said other one of said first and second generally cylindrical portions, said annular rings axially located on both of the axially spaced sides of said opening.

* * * * *